United States Patent [19]

Geisthoff

[11] Patent Number: 4,566,570
[45] Date of Patent: Jan. 28, 1986

[54] OVERLOAD CLUTCH

[75] Inventor: Hubert Geisthoff, Lohmar, Fed. Rep. of Germany

[73] Assignee: Jean Walterscheid GmbH

[21] Appl. No.: 524,302

[22] Filed: Aug. 18, 1983

[30] Foreign Application Priority Data

Aug. 19, 1982 [DE] Fed. Rep. of Germany ....... 3230817

[51] Int. Cl.⁴ .............................................. F16D 43/20
[52] U.S. Cl. .................................... 192/56 R; 464/43
[58] Field of Search ............... 192/150, 56 R; 464/37, 464/42, 43

[56] References Cited

U.S. PATENT DOCUMENTS 2,909,047 10/1959 Walterscheid-Muller et al. ... 192/56 R
4,261,453 4/1981 Kunze ................................ 192/56 R
4,386,689 6/1983 Kato ..................................... 464/36
4,417,650 11/1983 Geisthoff ........................... 192/56 R
4,467,902 8/1984 Girguis ................................. 464/36

FOREIGN PATENT DOCUMENTS 1316810 5/1973 United Kingdom ............ 192/56 R
2018368 10/1979 United Kingdom .................. 464/36
2078315 1/1982 United Kingdom .................. 464/36

Primary Examiner—Craig R. Feinberg
Assistant Examiner—David A. Okonsky
Attorney, Agent, or Firm—Toren, McGeady, Stanger Goldberg & Kiel

[57] ABSTRACT

An overload clutch wherein a clutch hub and a clutch sleeve are brought into and out of driving engagement by spring loaded driving members in the hub engaging into recesses in the sleeve. The disengagement of the clutch is achieved in stages by constructing the recesses so that the driving members will disengage individually at different torque transmission levels. More specifically, the depth of the recesses is varied to vary the disengagement levels of the driving members.

10 Claims, 6 Drawing Figures

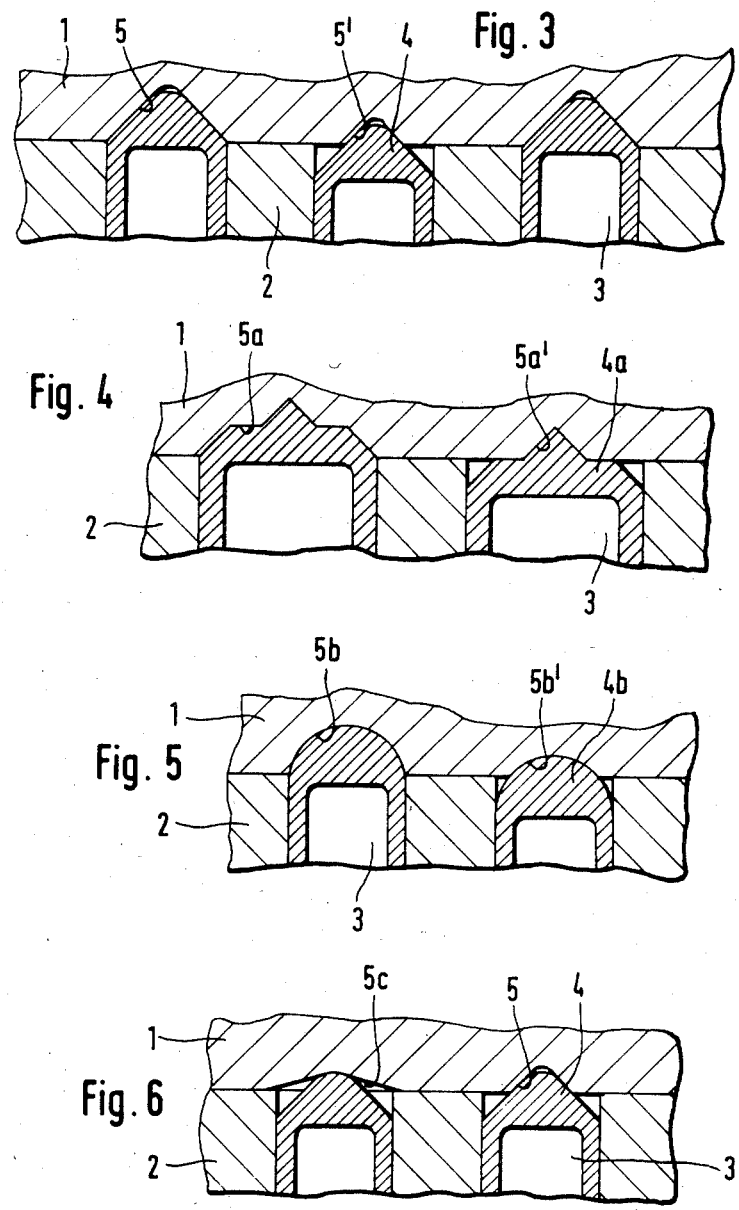

OVERLOAD CLUTCH

The present invention relates generally to safety clutch devices particularly for protecting machinery drive lines and especially for use with drive shafts in connecting agricultural implements to the power take-off shaft of a tractor.

More particularly, the invention relates to an overload or torque-limiting clutch wherein a first and a second drive member adapted to be connected to respective drive line components and rotatable about a common axis are engaged and disengaged by a plurality of driving members carried by one of the first and second members depending upon the level of torque transmission.

The overload clutches of the type to which the present invention relates may have spring biased driving members which are mounted on one of the driving or driven members of the clutch with recesses being formed in the other of the driving or driven members. The spring biased driving members are brought into and out of engagement with the recesses to permit disengagement of the clutch and relative rotation between the driving and driven members.

Usually, the driving and driven members comprise a hub carrying the driving members which are spring biased radially outwardly and a sleeve surrounding the hub having the recesses formed on the internal circumference thereof.

One form of a clutch of the type described above which is constructed in accordance with the prior art comprises different numbers of driving members and recesses and, when the clutch is in the torque-transmitting condition, only some of the driving members engage with the recesses. By structuring the device so that the number of driving members provided is different than the number of recesses provided, certain operational characteristics such as lack of excessive wear can be achieved, but the clutch will be unduly bulky for a particular capacity and the manufacturing costs thereof tend to be increased.

Accordingly, the present invention is directed toward provision of an improved overload clutch.

SUMMARY OF THE INVENTION

Briefly, the present invention may be described as an overload clutch particularly for drive lines connecting agricultural implements to the power takeoff shaft of a tractor comprising: a clutch hub; a clutch sleeve; a plurality of recesses in said clutch sleeve; and a plurality of spring-loaded driving members mounted in said clutch hub to engage and disengage said recesses to effect engagement and disengagement of said clutch; said recesses and said driving members being configured to effect disengagement of individual ones of said plurality of driving members from individual recesses at different torque-transmission levels.

In a more specific aspect of the invention, the individual recesses are formed with depths which are different than the depths of other recesses in order that certain driving members will disengage at different torque levels whereby the clutch may thereby become disengaged in stages.

In addition to forming recesses with different depths, the recesses may be formed with different angles of engagement and, accordingly, the effect which is achieved by the invention is that when an overload occurs, the change from the torque-transmitting condition of the clutch to the condition of relative rotation between the driving and driven members is not uniform as it would be if all the driving members and recesses were identical and disengaged at the same time. In a conventional clutch, a change in torque from the drive-transmitting condition to the disengaged or freewheeling condition is linear or approximately linear. However, in a clutch in accordance with the invention, the change of such torque includes at least one step. In this manner, transient peak torques which are very dangerous for the entire drive line will be damped.

Furthermore, peak torques which occur after the clutch becomes re-engaged are also reduced to a lower value.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DESCRIPTION OF THE DRAWINGS

In the drawings:

FIGS. 3, 4, 5, and 6 are partial sectional views showing differing embodiments of the invention.

DETAILED DESCRIPTION OF THE PREFERRED EMBODIMENTS

Figure 1:
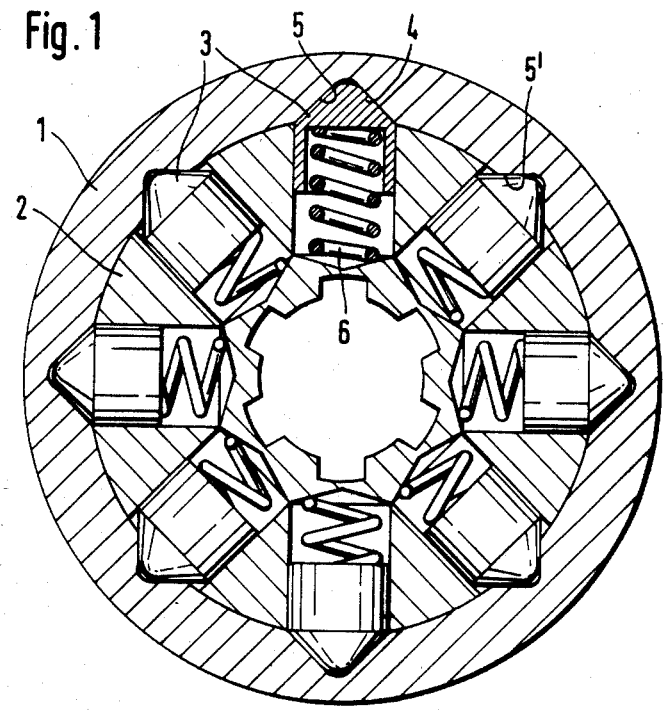
FIG. 1 is a sectional view taken through an overload clutch assembly in accordance with the present invention shown in the torque-transmitting or engaged condition.
Figure 2:
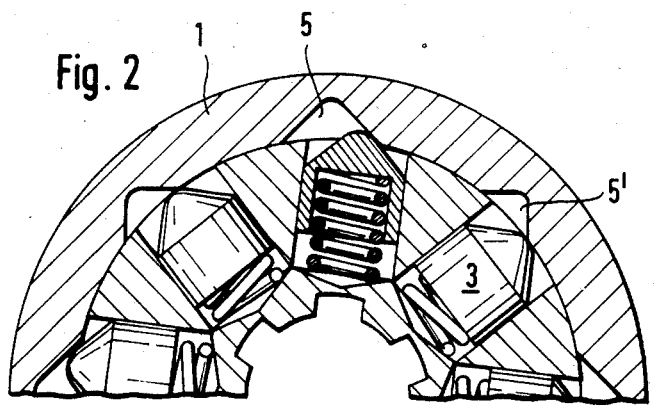
FIG. 2 is a partial sectional view of the clutch shown in FIG. 1 shown in the state of transition during change-over from the engaged to the disengaged condition.

A preferred embodiment of the invention, illustrated in FIGS. 1 and 2, comprises an overload clutch including a sleeve 1 and a clutch hub 2 which may be placed in rotative driving engagement with each other. The clutch hub 2 carries a plurality of driving members 3 having wedge-shaped heads 4 and spring-biased radially outwardly of the hub 2 by springs 6. The clutch sleeve 1 is formed with a plurality of angularly spaced recesses 5 and the wedge-shaped heads 4 of the driving members 3 operate to engage within the recesses 5 formed in the internal circumference of the sleeve 1. It will be seen that as the drive members 3 move radially outwardly under the force of the spring 6, they will engage in the recesses 5 and effect driving or torque-transmitting engagement between the members 1 and 2.

FIG. 2 illustrates the condition wherein the overload clutch is in a stage of transition from the engaged or torque-transmitting condition to the freewheeling or disengaged condition. As the level of torque transmitted reaches a certain predetermined level, the drive members 3 move radially inwardly against the forces of the springs 6 and tend to become disengaged from the recesses 5 thereby terminating torque transmission between the members 1 and 2.

As will be seen from the drawings, the recesses 5 formed in the sleeve 1 are constructed to be of a different depth, although they all are formed with basically the same shape with respect to the angle between their sides. For example, as will be evident from FIG. 2, the sleeve 1 is formed with recesses 5 which are of a greater depth than the recesses 5'. When the torque transmitted is greater than the limiting torque of the clutch, the drive members 3 will be forced inwardly against the biasing springs 6 until they disengage from the recesses 5. However, the driving members 3 which are engaged in the shallower recesses 5' will disengage from those recesses before disengagement occurs of the drive members engaged within the deeper recesses 5. For example, as will be seen from FIG. 2, the drive member 3 engaged within the recess 5' has already almost completely disengaged, while the drive member engaged within the deeper recess 5 is still partially engaged.

In the transitory stage depicted in FIG. 2, some torque will continue to be transmitted; however, the torque transmitted will be lower than the nominal torque. In this condition, the characteristics of the torque transmitted by the clutch in the changeover condition from the full driving condition to the released condition in which the hub and the sleeve rotate relative to each other occurs in a stepped mode of operation. If recesses of three different depths are used, then there would be two steps in the transitional torque transmitting characteristics of the clutch.

FIG. 3 shows the clutch of FIG. 1 and FIG. 2 in the engaged condition and in a developed form so that the difference in depths of the recesses can be more clearly seen.

In FIG. 4 there is shown a developed view of a modified embodiment of the invention wherein the heads 4a of the driving members are of a stepped configuration formed with two wedge-shaped portions. Some of the recesses 5a are of a stepped configuration corresponding to and receiving the entire head portions of the driving members, while other recesses 5'a receive only the radially outermost head portions of the driving members. Similar torque-transmitting characteristics as that of the clutch of FIGS. 1-3 are achieved.

FIG. 5 shows an alternative embodiment of the invention wherein head portions 4b of the driving members 3 are of a rounded configuration instead of wedge-shaped.

Recesses 5b and 5b' are of different depths.

FIG. 6 shows an embodiment wherein the driving members 3 have head portions 4 which are identical. However, the recesses 5 and the sleeve 1 are all of the same depth, but some are of shallower angle as seen at 5c. In this case also, the driving members 3 will emerge from the recesses of the sleeve 1 at a different angular rotation of the hub 2 relative to the sleeve 1. Again, a nonlinear changeover from the driving condition is achieved. Thus, it will be seen in the embodiment of FIG. 6, that the recesses having the steeper angle will disengage at a later time than the recesses having sides with a more gentle slope.

Thus, from the foregoing, it will be seen that the invention provides an overload clutch of the type having a driving and a driven member in the form of a hub and a sleeve with spring-biased driving members engaging into recesses in the sleeve wherein some of the recesses have depths and/or angles of engagement with the driving member different from others thereof. By means of this arrangement, the transition from the torque-transmitting condition to the ratchet or freewheeling disengaged condition occurs in two or more distinct phases, thereby reducing negative torque peaks and damping torsional vibration.

The invention provides a safety overload clutch wherein the disengaging impact forces with the high negative peaks are damped with the resulting inclination toward production of vibrations being reduced.

While specific embodiments of the invention have been shown and described in detail to illustrate the application of the inventive principles, it will be understood that the invention may be embodied otherwise without departing from such principles.

What is claimed is:

1. An overload clutch particularly for drive lines connecting agricultural implements to a power takeoff shaft of a tractor comprising: a clutch hub; a clutch sleeve; a plurality of recesses in said clutch sleeve; and a plurality of spring-loaded driving members mounted in said clutch hub to engage and disengage said recesses to effect engagement and disengagement of said clutch; said recesses and said driving members being configured to effect disengagement of certain individual ones of said plurality of driving members at different torque transmission levels than remaining driving members of said plurality of driving members.

2. A clutch according to claim 1 wherein said plurality of recesses comprise recesses having different depths.

3. A clutch according to claim 1 wherein said recesses and said driving members are configured so that the engaging surfaces therebetween are formed with differing angles for different driving members and recesses.

4. A clutch according to claim 1 wherein said driving members and recesses are generally wedge-shaped.

5. A clutch according to claim 1 wherein said driving members have head portions engaging in said recesses which are of a stepped configuration.

6. A clutch according to claim 1 wherein said driving members and said recesses have facing abutting surfaces at which said driving members engage in said recesses to drive said clutch, said facing abutting surfaces of at least one of said recesses having a different slope or inclination than other of said recesses.

7. An overload clutch particularly for drive lines connecting agricultural implements to a power takeoff shaft of a tractor comprising: a driven member; a driving member; a plurality of recesses in one of said driving and driven members; and a plurality of spring-loaded driving members mounted in the other of said driving and driven members to engage and disengage said recesses to effect engagement and disengagement of said clutch; said recesses and said driving members being configured to effect disengagement of individual ones of said plurality of driving members at different torque transmitting levels than the other driving members of said plurality.

8. A clutch according to claim 7, wherein said plurality of recesses comprise recessed having different depths.

9. An overload clutch particularly for drive lines connecting agricultural implements to a power takeoff shaft of a tractor comprising: a driven member; a driving member; a plurality of recesses in one of said driving and driven members; and a plurality of spring-loaded driving members mounted in the other of said driving and driven members to engage and disengage said recesses to effect engagement and disengagement of said clutch; said recesses and said driving members being configured to effect disengagement of individual ones of said plurality of driving members at different torque transmitting levels than remaining driving members of said plurality of driving members; said recesses and said driving members being configured so that the engaging surfaces therebetween are formed with differing angles for different driving members and recesses.

10. An overload clutch particularly for drive lines connecting agricultural implements to a power takeoff shaft of a tractor comprising: a driven member; a driving member; a plurality of recesses in one of said driving and driven members; and a plurality of spring-loaded driving members mounted in the other of said driving and driven members to engage and disengage said recesses to effect engagement and disengagement of said clutch; said recesses and said driving members being configured to effect disengagement of individual ones of said plurality of driving members at different torque transmitting levels than remaining driving members of said plurality of driving members; said driving members and said recesses having facing abutting surfaces at which said driving members engage in said recesses to drive said clutch, said facing abutting surfaces of at least one of said recesses having a different slope or inclination than the other of said recesses.

* * * * *